United States Patent
Yamada et al.

[11] Patent Number: 6,055,841
[45] Date of Patent: May 2, 2000

[54] DEVICE FOR CALIBRATING LONGITUDINAL ACCELERATION SENSOR OF VEHICLE THROUGH INERTIAL RUNNING

[75] Inventors: Yoshihisa Yamada, Shizuoka-ken; Shiro Monzaki, Mishima, both of Japan

[73] Assignee: Toyota Jidosha Kabushiki Kaisha, Toyota, Japan

[21] Appl. No.: 09/221,998

[22] Filed: Dec. 29, 1998

[30] Foreign Application Priority Data

Feb. 27, 1998 [JP] Japan .................................. 10-064705

[51] Int. Cl.[7] ................................................... G01P 21/00
[52] U.S. Cl. ........................ 73/1.38; 73/1.39; 701/70; 702/87; 702/141
[58] Field of Search ....................... 73/1.38, 1.39, 73/514.01, 514.36; 701/70; 702/87, 96, 141

[56] References Cited

U.S. PATENT DOCUMENTS

| | | | |
|---|---|---|---|
| 5,203,821 | 4/1993 | Tanaka | 73/1.38 |
| 5,307,274 | 4/1994 | Takata et al. | 73/1.38 |
| 5,369,580 | 11/1994 | Monji et al. | 73/514.01 |
| 5,526,263 | 6/1996 | Tanaka et al. | 73/1.38 |
| 5,608,631 | 3/1997 | Tsutsumi et al. | 73/1.38 |
| 5,702,165 | 12/1997 | Koibuchi | 303/146 |
| 5,925,087 | 7/1999 | Ohnishi et al. | 701/70 |

FOREIGN PATENT DOCUMENTS

Y2-7-17525  4/1995  Japan .

*Primary Examiner*—Daniel S. Larkin
*Assistant Examiner*—Chad Soliz
*Attorney, Agent, or Firm*—Oliff & Berridge, PLC

[57] ABSTRACT

A device for calibrating a neutral point of a longitudinal acceleration sensor of a vehicle, having a detector for detecting that the vehicle is running at a speed higher than a predetermined threshold speed, a detector for detecting that the vehicle is not braked beyond a predetermined threshold braking, a detector for detecting that the vehicle is not driven beyond a predetermined threshold traction, and a detector for detecting output of the longitudinal acceleration sensor to provide a deflection of its neutral point when the running detector is detecting that the vehicle is running at a speed higher than the predetermined threshold speed, the braking detector is detecting that the vehicle is not braked beyond the predetermined threshold braking, and the traction detector is detecting that the vehicle is not driven beyond the predetermined traction, respectively.

7 Claims, 2 Drawing Sheets

DEVICE FOR CALIBRATING LONGITUDINAL ACCELERATION SENSOR OF VEHICLE THROUGH INERTIAL RUNNING

BACKGROUND OF THE INVENTION

1. Field of the Invention

The present invention relates generally to a longitudinal acceleration sensor, and more particularly, to a device for calibrating a longitudinal acceleration sensor of a vehicle.

2. Description of the Prior Art

The longitudinal acceleration sensor is one of the essential sensors of the modern vehicles incorporating the so-called vehicle stability control which automatically controls running behaviors of the vehicles for higher performances and stability thereof based upon calculations of vehicle dynamics made available by the developments of micro-computers. In order to ensure the actual effectiveness of those vehicle stability controls, it is very important that the longitudinal acceleration sensors are correctly calibrated, particularly with respect to the neutral point thereof.

Since the longitudinal acceleration sensor generally incorporates a pendulum responsive to the gravitational force of the earth, while the grounds where the vehicles are stopped or parked are not always correctly horizontal, it is not generally possible to calibrate the neutral point of the longitudinal acceleration sensor in such a static manner as to measure a shifting of the natural stop position of the pendulum from a geometrically neutral position of the longitudinal acceleration sensor.

In Japanese Utility Model Publication 7-17525 filed by the assignee company of the present application together with a co-applicant, it has been proposed to calibrate a longitudinal acceleration sensor of a vehicle by calculating a mean value of the output of the longitudinal acceleration sensor through a period of running of the vehicle, and then comparing the mean value with the output value of the longitudinal acceleration sensor during a stoppage of the vehicle, so as to presume that, when the both are substantially equal to one another, the vehicle is stopped on a horizontal base, thereby presuming said output value as a shifting of the neutral point of the longitudinal acceleration sensor.

The above prior art will provide a good calibration of the longitudinal acceleration sensor when the calibration is made by using data collected over a relatively long period of running of the vehicle such that the deflections of the output of the sensor due to sloping up runnings of the vehicle are naturally canceled by those due to sloping down runnings of the vehicle in a certain stable daily driving area.

SUMMARY OF THE INVENTION

It is therefore a primary object of the present invention to provide an improved device for calibrating longitudinal acceleration sensors of vehicles which can provide a correct calibration of the longitudinal acceleration sensors in a short period of calibration without being affected by the geographical conditions of the running area of the vehicles.

According to the present, invention, the above-mentioned primary object is accomplished by a device for calibrating a neutral point of a longitudinal acceleration sensor of a vehicle, comprising:

means for detecting that the vehicle is running at a speed higher than a predetermined threshold speed;

means for detecting that the vehicle is not braked beyond a predetermined threshold braking;

means for detecting that the vehicle is not driven beyond a predetermined threshold traction; and means for detecting output of the longitudinal acceleration sensor to provide a deflection of the neutral point thereof when the running detection means are detecting that the vehicle is running at a speed higher than the predetermined threshold speed, the braking detection means are detecting that the vehicle is not braked beyond the predetermined threshold braking, and the traction detection means are detecting that the vehicle is not driven beyond the predetermined traction, respectively.

In the above-mentioned device, the longitudinal acceleration sensor output detection means may provide the deflection of the neutral point of the longitudinal acceleration sensor based upon the output thereof when the running detection means are continuously detecting for a threshold period predetermined therefor that the vehicle is running at a speed higher than the predetermined threshold speed, the braking detection means are continuously detecting for a threshold period predetermined therefor that the vehicle is not braked beyond the predetermined threshold braking, and the traction detection means are continuously detecting for a threshold period predetermined therefor that the vehicle is not driven beyond the predetermined threshold traction, respectively.

Further, the running detection means may further detect that the vehicle is running at a speed lower than a limit speed predetermined therefor, and the longitudinal acceleration sensor output detection means may provide the deflection of the neutral point of the longitudinal acceleration sensor based upon the output thereof when the running detection means are detecting that the vehicle is running at a speed lower than the limit speed predetermined therefor.

In the above-mentioned device, the braking detection means may sense at least one of pressure of the brake master cylinder of the vehicle being not higher than a predetermined threshold pressure and depression of the brake pedal of the vehicle being not deeper than a predetermined depth so as to detect that the vehicle is not braked beyond the predetermined threshold braking.

In the above-mentioned device, the traction detection means may compare input and output rotation speeds of the torque converter of the vehicle so as to detect that the vehicle is not driven beyond the predetermined threshold traction when the input rotation speed is not higher than the output rotation speed beyond a limit predetermined therefor, or so as to detect that the vehicle is not braked beyond the predetermined threshold braking when the input rotation speed is not lower than the output rotation speed beyond a limit predetermined therefor.

BRIEF DESCRIPTION OF THE DRAWINGS

In the accompanying drawings.

DESCRIPTION OF THE EMBODIMENTS

In the following, the present invention will be described in more detail in the form of an embodiment with reference to the accompanying drawings.

Figure 1:
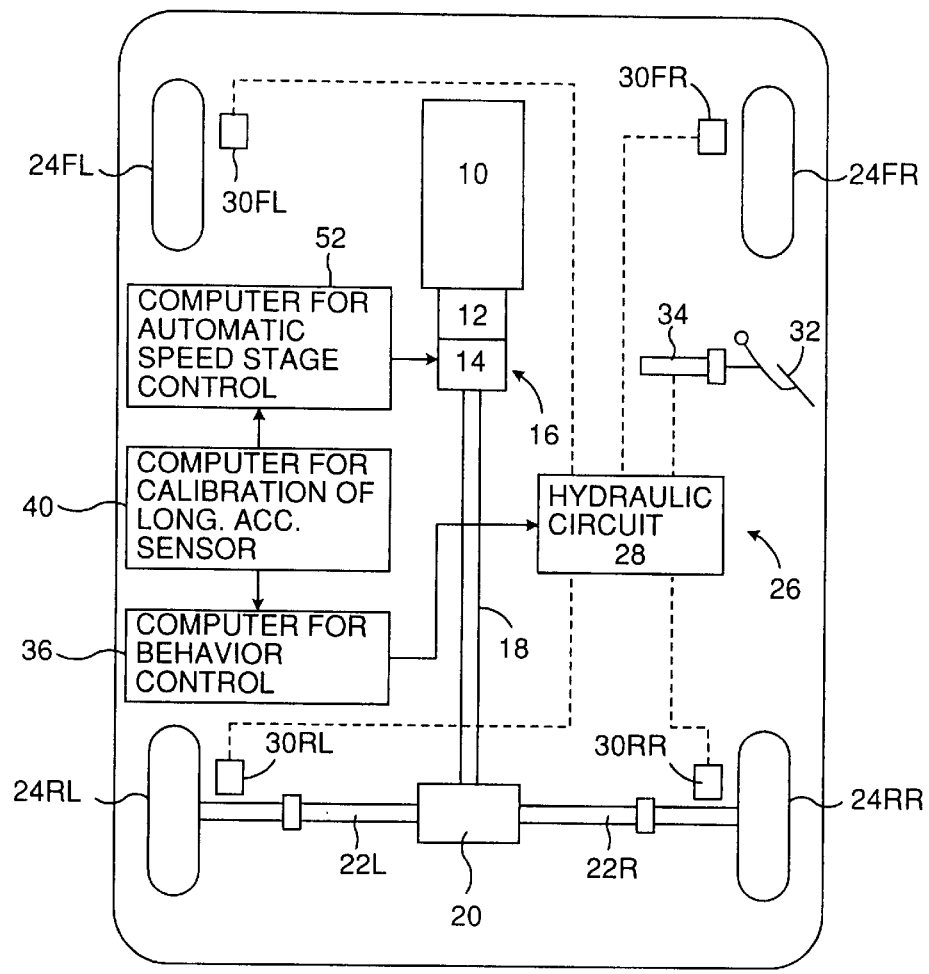
FIG. 1 is a diagrammatical plan view of a vehicle such as a four-wheeled automobile in which a longitudinal acceleration sensor and a device for calibrating the same according to the present invention is incorporated.

Referring to FIG. 1, the four wheeled automobile herein shown has a pair of non-driven front left and front right wheels 24FL and 24FR adapted to be steered by a steering system not shown in the figure, and a pair of rear left and rear right wheels 24RL and 24RR adapted to be driven by an engine 10 via an automatic transmission 16 including a torque converter 12 and a changeover gear mechanisms 14, a propeller shaft 18, a differential gear 20, and rear let and rear right axles 22L and 22R, respectively. The wheels 24FL, 24FR, 24RL and 24RR are equipped with wheel cylinders 30FL, 30FR, 30RL and 30RR, respectively, for braking the corresponding wheels when a hydraulic pressure is applied thereto from a hydraulic circuit 28 adapted to be manually controlled according to a depression of a brake pedal 32 by a driver via a master cylinder 34 on one hand, while on the other hand the hydraulic circuit 28 is automatically controlled by a computer 36 for a behavior control. The automatic behavior control for vehicles such as automobiles is already known as various patented inventions. One of them, for example, is U.S. Pat. No. 5,702,165, assigned to the same assignee as the present application, having a title of the invention reading "Behavior control system of vehicle distinctive of oversteered and understeered conditions".

A computer 40 for the calibration of a longitudinal acceleration sensor according to the present invention is provided to operationally act on the computer 36 for the behavior control and also on a computer 52 for automatic speed stage control which automatically changes over the transmission gear mechanism 14 according to running conditions of the vehicle. Such an automatic speed stage control is also well known in the art of automobile.

Figure 2:
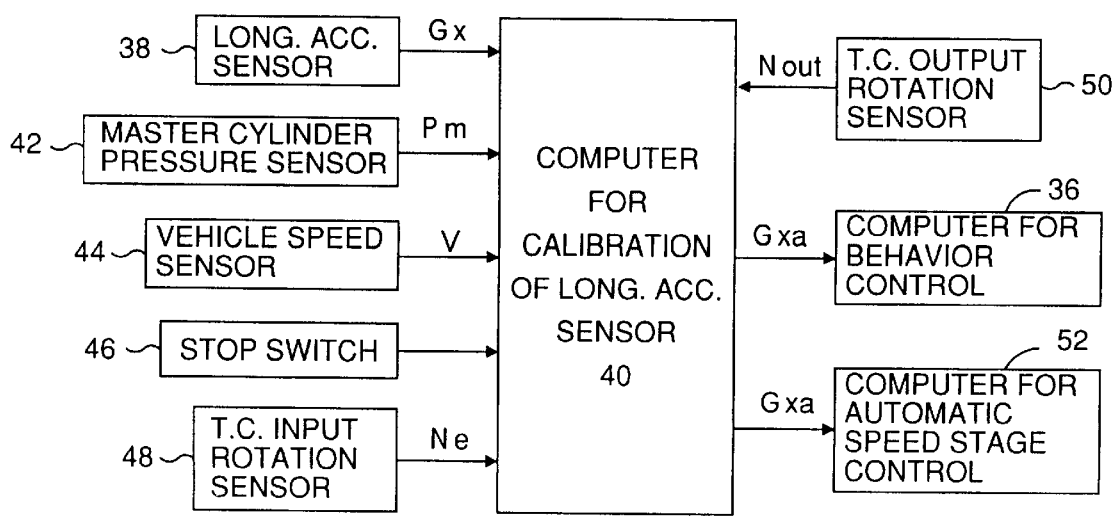
FIG. 2 is a diagrammatical illustration of an embodiment of the device for calibrating the longitudinal acceleration sensor according to the present invention.

As shown in FIG. 2, the computer 40 for the calibration of the longitudinal acceleration sensor is supplied with various signals such as a signal representing longitudinal acceleration Gx from a longitudinal acceleration sensor 38, a signal representing master cylinder pressure Pm from a master cylinder pressure sensor 42, a signal representing vehicle speed V from a vehicle speed sensor 44, an on/off signal indicating a depression of the brake pedal 32 beyond a predetermined depth from a stop switch 46, a signal representing input rotation speed Ne of the torque converter 12 from a torque converter input rotation sensor 48, and a signal representing output rotation speed Nout of the torque converter 12 from a torque converter output rotation sensor 50. The computer 40 for the calibration of the longitudinal acceleration sensor may be of an ordinary type having a central processor unit, a read only memory, a random access memory, input and output port means and a common bus interconnecting these elements, and carries out a calibration operation as described hereinbelow with reference to FIG. 3, and outputs a signal representing longitudinal acceleration Gxa refined from the output signal of the longitudinal acceleration sensor 38 bearing Gx detected thereby according to the calibration of the neutral point thereof toward the computer 36 for the behavior control and the computer 52 for the automatic speed stage control.

An embodiment of the longitudinal acceleration sensor calibration device according to the present invention constructed as the computer 40 will be described in the form of operations thereof with reference to the flowchart shown in FIG. 3.

When an ignition switch (not shown) of the vehicle shown in FIG. 1 is turned on, the computer 40 is put on together with other computers 36 and 42. When the computer 40 is started, in step 10 it is judged if a time counted continuously by a clock timer from the first moment of use of the device or each reset thereof to zero described later with reference to step 10 has lapsed a predetermined period Pr. The period Pr is such a period that is designed to be desirable as a cycle period for repetitive re-calibrations of the longitudinal acceleration sensor. The cycle period may be a month or a few months, so that any one time calibration resulted by chance in a not very accurate calibration is not maintained for a long time, while considering that too often calibration is in fact not necessary. If the answer is no, the control proceeds to step 20.

In step 20, it is judged by an auxiliary odometer (not shown) if a distance D measured thereby has reached a predetermined distance Dr. The distance Dr is a distance to be designed as a cycle distance for repetitive re-calibrations of the longitudinal acceleration sensor. The distance may be, for example, every three thousand kilometers. When the answer is yes, the control proceeds to step 30.

When the answer of step 10 is yes, the control proceeds to step 30, while bypassing step 20. When the answer of step 20 is no, the control returns to step 10, with no substantial execution of the calibration operation.

In step 30, signals such as shown in FIG. 2 are read in.

In step 40, it is judged if the vehicle speed V is higher than a predetermined threshold speed Vs. The purpose of this step is to judge if the vehicle is running at a relatively moderate speed high enough to be indicative of a stabilized inertial running. The threshold speed Vs may desirably be, for example, 20 km/h. Further, as a modification, it may also be judged if the vehicle speed V is lower than a predetermined limit speed Vm. The purpose of judgment for the limit speed Vm will be described later. When the answer is yes, the control proceeds to step 50.

In step 50, it is judged if the braking beyond a predetermined threshold braking Bs is applied. The strength of the braking may be estimated according to a depth of depression of the brake pedal 32 or the pressure value of the master cylinder pressure Pm. The purpose of step 50 is to confirm that no such substantial braking is applied to the vehicle that will cause an inertial forward shifting of the pendulum (not shown) of the longitudinal acceleration sensor 38. When the answer is no, the control proceeds to step 60.

In step 60, it is judged if a traction T larger than a predetermined threshold traction Ts in its absolute value is applied to the automobile. The traction T may be estimated by a difference or a ratio of the input rotation speed Ne to the output rotation speed Nout of the torque converter 12, to be positive, or engine drive, when the former is larger than the latter, and to be negative, or engine brake, when the former is smaller than the latter. The purpose of step 60 is to confirm that the vehicle is not substantially driven by the engine or braked backward by the engine braking. When T is a negative value, the backward traction is evaluated as a braking, in addition to the value of B. When the answer is no, the control proceeds to step 70.

In step 70, it is judged if a count C is equal to or larger than a threshold count Cs. The purpose of step 70 is to confirm that the conditions judged by the steps 40, 50 and 60 are continuing over a certain duration indicative of a stabilized inertial running of the vehicle long enough to stabilize the pendulum of the longitudinal acceleration sensor 38 at its neutral position. The threshold count Cs may be a count value corresponding to a period of a minute. When the answer is no, the control proceeds to step 80.

In step 80, the count C is counted up by one and the control returns to step 30. When the answer of step 40 is yes, or any of steps 50 and 60 is no, the control proceeds to step 90, where the count C is reset to zero, and then the control returns to step 30.

When the answer of step 70 is yes, the control proceeds to step 100. In step 100, the offset of the neutral point of the longitudinal acceleration sensor 38, i.e. the shifting of the pendulum thereof from the geometrically neutral position thereof, is calculated and renewed, as a value for additively or subtractively modifying the value of Gx based upon the output of the longitudinal acceleration sensor 38 to provide a calibrated value Gxa of the longitudinal acceleration sensor.

In step 110, the accumulation value P of the clock timer for watching the cycle period Pr and the accumulation value D of the odometer for watching the cycle distance Dr for re-calibration are reset to zero, and the control returns to step 10.

When the vehicle speed is conditioned to be higher than the threshold speed Vs, an inertial running of the vehicle over a period long enough for the pendulum of the longitudinal acceleration sensor to get stabilized at its neutral position is ensured, or conversely, the threshold speed Vs is determined to be such a speed that ensures an inertial running of the vehicle for a period during which the pendulum of the longitudinal acceleration sensor can stabilize at its neutral point. Such a vehicle speed will generally be about 20 km/h at the minimum. If the vehicle speed is lower than such a speed, the inertial running of the vehicle will cease before the pendulum of the longitudinal acceleration sensor stabilizes at its neutral position. On the other hand, when the vehicle is running seemingly inertially at a relatively high speed, it will be suspected that the vehicle is running down on a descent with the pendulum of the longitudinal acceleration sensor being stabilized at a deflected neutral position inclined relative to the vehicle body by an angle corresponding to the slope angle of the descent. Therefore, as a modification, in step 40, it may also be judged if the vehicle speed V is lower than the limit speed Vm which may be a speed such as 80 km/h.

When the vehicle is running at a speed of such a range, it will be very common that the brake pedal is completely released, or not depressed at all. When the automobile is not braked, the position of the pendulum of the longitudinal acceleration sensor is of course not affected by the braking.

The drive system of a vehicle such as an automobile employing an internal combustion engine as a prime mover presents three phases of running operation, i.e. an engine driving, an engine braking and a midway therebetween in which the acceleration pedal is very lightly depressed while the vehicle is running inertially with no power being transmitted in either direction between the engine and the driven wheels, so that there is no difference between the rotation speed of the input member and the output member of the torque converter. Such an inertial running of the vehicle will continue over a substantial duration only when the vehicle is running on the substantially horizontal road at a moderate speed such as above 20 km/h. When the vehicle is running up an ascent, since the vehicle is soon decelerated, the driver will unconsciously increases the depression of the accelerator pedal, so that the traction T detected by the traction detection means increases beyond the threshold value Ts.

When the vehicle is running down on a descent, such an inertial running will soon end as an engine braking starts, so that there occurs a difference between the rotation speed of the input and output members of the torque converter in the opposite direction so as to increase such that the absolute value of T becomes larger than the threshold traction Ts. Therefore, when the threshold traction Ts is appropriately designed to be small enough, it is avoided that the calibration of the longitudinal acceleration sensor for its neutral position is carried out when the vehicle is running up or down on a slope, where, even when the vehicle is running seemingly inertially at a constant speed, the pendulum of the longitudinal acceleration sensor is stabilized with a deviation inclination relative to the vehicle body according to the angle of inclination of the slope.

Figure 3:
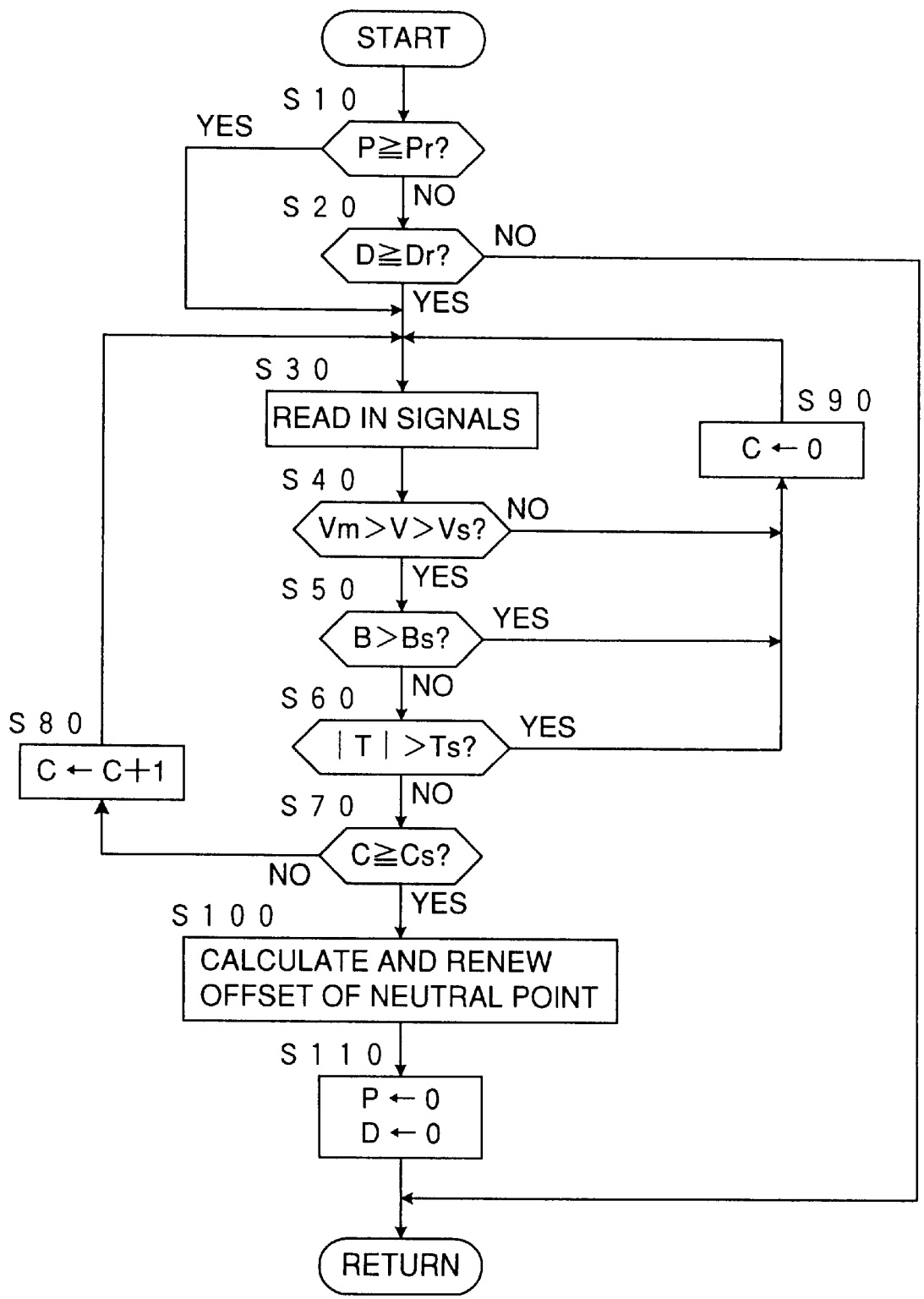
FIG. 3 is a flowchart showing the operation of the device for calibrating the longitudinal acceleration sensor shown in FIG. 2.

Thus, it will be appreciated that according to the steps shown in the flowchart of FIG. 3, the longitudinal acceleration sensor is correctly calibrated for its neutral position, avoiding that the pendulum thereof responsive to the gravitation of the earth erroneously calibrated due to a longitudinal inclination of the vehicle body from the perpendicularity to the direction of gravitation.

In the calibration process of FIG. 3, it will be noted that the threshold count Cs should be designed to determine the corresponding threshold period long enough to be able to detect the position of the pendulum as stabilized enough at its neutral position but not so long as to miss the chance of calibration.

Although the present invention has been described in detail with respect to a preferred embodiment thereof, it will be apparent for those skilled in the art that various modifications are possible with respect to the shown embodiments within the scope of the present invention.

What is claimed is:

1. A device for calibrating a neutral point of a longitudinal acceleration sensor of a vehicle, comprising:

means for detecting that the vehicle is running at a speed higher than a predetermined threshold speed;

means for detecting that the vehicle is not braked beyond a predetermined threshold braking;

means for detecting that the vehicle is not driven beyond a predetermined threshold traction; and means for detecting output of the longitudinal acceleration sensor to provide a deflection of the neutral point thereof when the running detection means are detecting that the vehicle is running at a speed higher than the predetermined threshold speed, the braking detection means are detecting that the vehicle is not braked beyond the predetermined threshold braking, and the traction detection means are detecting that the vehicle is not driven beyond the predetermined traction, respectively.

2. A device according to claim 1, wherein the longitudinal acceleration sensor output detection means provide the deflection of the neutral point of the longitudinal acceleration sensor based upon the output thereof when the running detection means are continuously detecting for a threshold period predetermined therefor that the vehicle is running at a speed higher than the predetermined threshold speed, the braking detection means are continuously detecting for a threshold period predetermined therefor that the vehicle is not braked beyond the predetermined threshold braking, and the traction detection means are continuously detecting for a threshold period predetermined therefor that the vehicle is not driven beyond the predetermined threshold traction, respectively.

3. A device according to claim 1, wherein the running detection means further detect that the vehicle is running at a speed lower than a limit speed predetermined therefor, and the longitudinal acceleration sensor output detection means provide the deflection of the neutral point of the longitudinal acceleration sensor based upon the output thereof when the running detection means are detecting that the vehicle is running at a speed lower than the limit speed predetermined therefor.

4. A device according to claim 2, wherein the running detection means further detect that the vehicle is running at a speed lower than a limit speed predetermined therefor, and the longitudinal acceleration sensor output detection means provide the deflection of the neutral point of the longitudinal acceleration sensor based upon the output thereof when the running detection means are detecting that the vehicle is running at a speed lower than the limit speed predetermined therefor.

5. A device according to claim 1, wherein the vehicle comprises a brake master cylinder and a brake pedal adapted to be depressed by a driver for compressing the brake master cylinder, the braking detection means sensing at least one of pressure of the brake master cylinder being not higher than a predetermined threshold pressure and depression of the brake pedal being not deeper than a predetermined depth so as to detect that the vehicle is not braked beyond the predetermined threshold braking.

6. A device according to claim 1, wherein the vehicle comprises a torque converter for driving thereof, the traction detection means comparing input and output rotation speeds of the torque converter so as to detect that the vehicle is not driven beyond the predetermined threshold traction when the input rotation speed is not higher than the output rotation speed beyond a limit predetermined therefor.

7. A device according to claim 1, wherein the vehicle comprises a torque converter for driving thereof, the braking detection means comparing input and output rotation speeds of the torque converter so as to detect that the vehicle is not braked beyond the predetermined threshold braking when the input rotation speed is not lower than the output rotation speed beyond a limit predetermined therefor.

* * * * *